UNITED STATES PATENT OFFICE.

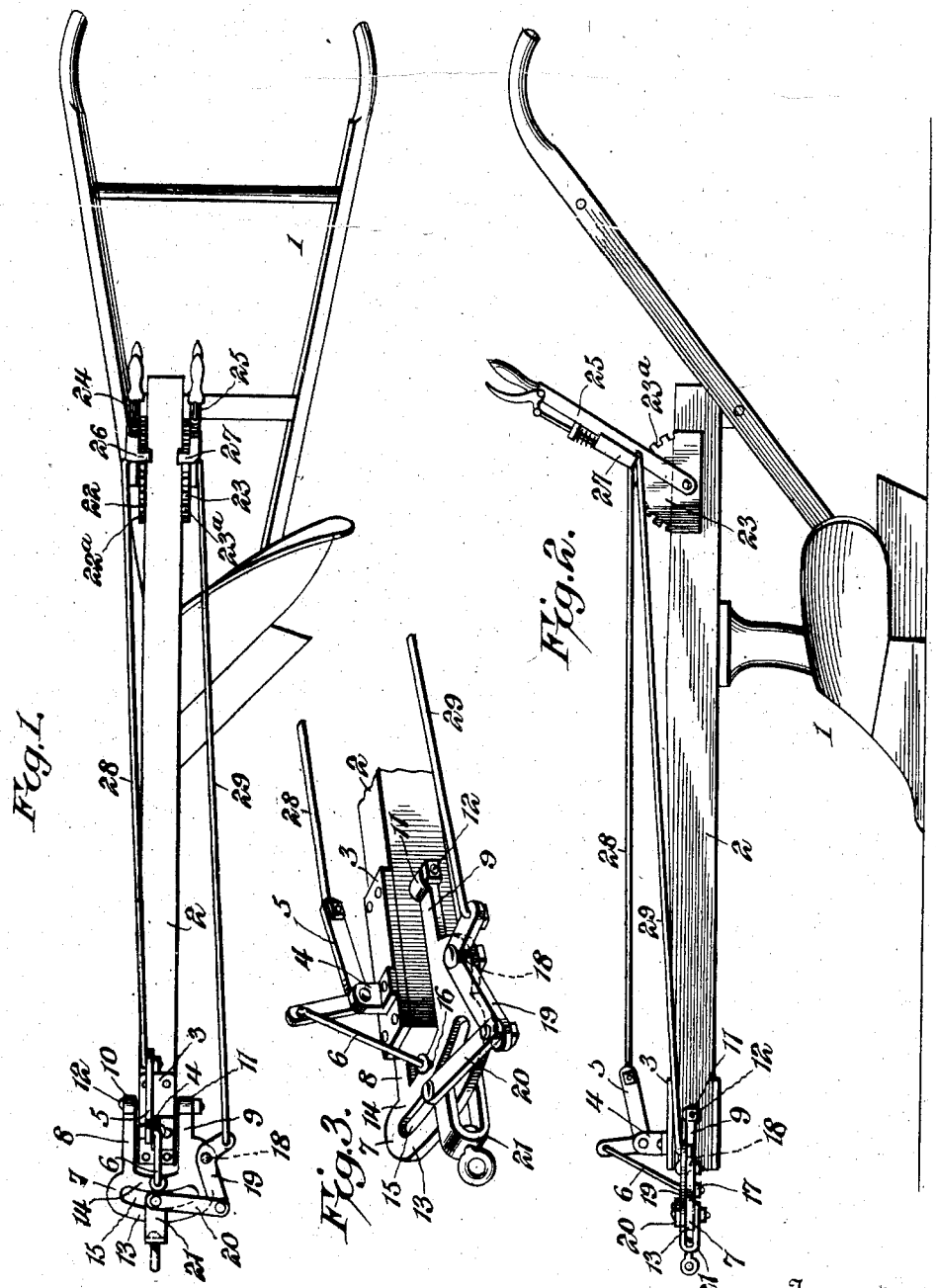

JOHN F. CASSMAN, OF LAKE CICOTT, INDIANA.

CLEVIS FOR PLOWS.

No. 901,780.  Specification of Letters Patent.  Patented Oct. 20, 1908.

Application filed December 31, 1907.  Serial No. 408,798.

*To all whom it may concern:*

Be it known that I, JOHN F. CASSMAN, a citizen of the United States, residing at Lake Cicott, in the county of Cass and State of Indiana, have invented certain new and useful Improvements in Clevises for Plows, of which the following is a specification.

The present invention consists in certain new and useful improvements in clevises for plows, and has specially in view the production of a novel form of adjusting means therefor in which provision is made for both a vertical and a horizontal adjustment of the clevis, to provide for an instantaneous change of work to cause the plow to cut deeper or shallower as desired, and also to cut wider or narrower.

With the above and many other objects in view, the invention consists in certain details of construction and combination of parts, a preferred embodiment of which is illustrated in the accompanying drawings, described in detail in the following specification, and pointed out in the appended claims.

In said drawings, wherein like characters of reference designate corresponding parts,—Figure 1 is a top plan view of a plow showing my present invention applied thereto. Fig. 2 is a side elevation thereof. Fig. 3 is a detail view of the clevis, showing the same detached from the plow beam.

Referring to the accompanying drawings, 1 designates a plow which may be of the usual or any preferred type, the beam 2 of which carries at its outer end, and on top thereof, a plate 3 provided with an upstanding ear 4, to which is pivoted a vertically arranged bell-crank lever 5. A pendent rod 6 has a pivotal connection with the outer end of said bell-crank lever 5, its other end being connected with the clevis 7 as will be presently explained.

The aforesaid clevis 7 is arranged to surround the outer end and part of the sides of the plow beam, and consists of the two side members 8 and 9, one of which, namely the side member designated by the reference character 9, is of a greater width, as will be presently explained. The two side members 8 and 9 have their inner ends formed with upturned edges forming horizontal eyes 10—11 for the reception of a pivot bolt 12 that extends through the plow beam and enters each of said eyes. The outer ends of said side members project beyond the plow beam and are connected together by means of the outwardly curved end member 13, and intermediate of said curved end member a cross-bar 14 connects said side members, said cross-bar being of the same curvature as the end member, to provide a curved guiding slot 15 therebetween. The cross-bar 14, is provided with an eye bolt 16 which is rigidly held in position by the nut 17, or other equivalent fastener. The eye is pivotally engaged by the pendent rod 6.

The parts of the clevis just described, namely the end and side members and the cross-bar are preferably stamped from one piece of material.

The widened side member 9 of the clevis has formed therein an opening 18 to provide for the pivotal engagement therewith of a horizontally arranged bell-crank lever 19, the outer end of which has pivoted thereto a link 20 which is in turn pivoted to a U-shaped double-tree coupling 21. Said U-shaped double-tree coupling is formed to embrace the outer end member 13 of the clevis, and its pivotal connection with the link 20 is arranged so that it travels in, and is guided by, the curved guiding slot 15.

Adjacent to the inner end of the plow beam 2 and upon each side thereof are mounted segment racks 22 and 23, the upper edges of which are in semi-circular form and provided with ratchet teeth 22$^a$ and 23$^a$, and pivoted to each of said segment racks are the adjusting levers 24—25 carrying pawls 26—27 which engage with the ratchet teeth of said segment racks. The lever 24 has a rod connection 28 with the inner end of the vertically arranged bell-crank lever 5, and the lever 25 has a similar rod connection 29 with the horizontally arranged bell-crank lever 19 carried by the widened side member 9 of the clevis. These two operating levers are arranged in a position where they may be readily accessible to the person controlling the plow.

The various adjustments of the clevis are obtained in the following manner:—Manipulation of lever 24, through its rod connection 28 with the vertically arranged bell-crank lever 5, and the latter's connection with the cross-bar 14 of the clevis 7, will result in a vertical adjustment of the said clevis, with the result that the cut is either made deeper or shallower accordingly as the clevis is either raised or lowered. A corresponding manipulation of lever 25, through its rod connection 29 with the horizontally arranged bell-crank lever 19, and the latter's connection with the double-tree coupling 21, will result in a horizontal movement being imparted to said coupling within the guiding slot 15 of the clevis, with an increase or decrease in the width of the cut being made according to the direction of such horizontal movement.

In the foregoing description and in the accompanying drawings I have set forth a practical and preferred embodiment of my invention, yet I wish it to be understood that changes in the details of construction and combination of parts may be made without departing from the spirit of the invention such as falls within the scope of the appended claims.

I claim as my invention:—

1. In combination with a plow beam, a clevis having side portions connected to the beam and provided with a slotted front portion, a double-tree coupling slidingly mounted in the slotted portion of said clevis, and means carried by one of the side portions of the clevis for imparting movement to the double-tree coupling.

2. In combination with a plow beam, a clevis having side portions pivoted to the beam and provided with a slotted front portion, means carried by said beam for shifting the clevis, a double-tree coupling slidingly mounted in the slotted portion of said clevis, and means carried by one of the side portions of the clevis to impart movement to the double-tree coupling.

3. In combination with a plow beam, a clevis having side portions pivoted to the beam and provided with a slotted front portion, means carried by said beam for raising and lowering the clevis, a double-tree coupling slidingly mounted in the slotted portion of said clevis, a link in engagement with said double-tree coupling, and coöperating means carried by one of said side portions of the clevis and also having engagement with said link for imparting movement to the double-tree coupling.

4. In combination with a plow beam, a clevis consisting of side members having a pivotal engagement with the plow beam and provided with a front projected portion having formed therein a curved guide slot, a bell-crank lever carried by the plow beam and having a connection with said clevis, a bell-crank lever carried by one of the said side members of the clevis, a double-tree coupling slidingly mounted in said guide slot and having a linked pivotal connection with the bell-crank lever carried by the side member, an adjusting lever having connection with the bell crank lever carried by the plow beam for imparting a vertical movement to the clevis, and an adjusting lever having connection with the bell crank lever carried by the side member for imparting movement to the double tree coupling within the slot.

5. In combination with a plow beam, a clevis consisting of integral side and end members and an intermediate cross-bar, the side members being pivoted to said plow beam and the end member and the cross-bar being arranged to form between them a curved guiding slot, a bell-crank lever carried by the plow beam and having a connection with said clevis, an adjusting lever having a connection with said bell-crank lever to raise or lower said clevis, a bell-crank lever carried by one of said side members, a double tree coupling slidingly mounted in the curved slot of the clevis and having a pivotal link connection with the last-mentioned bell-crank lever, and an adjusting lever having a connection with said last mentioned bell-crank lever for imparting a movement to said double-tree coupling within the guiding slot.

In testimony whereof I affix my signature in presence of two witnesses.

JOHN F. CASSMAN.

Witnesses:
GEORGE A. CUSTER,
MICHAEL L. FAUSLER.